(12) United States Patent  
Motobayashi et al.

(10) Patent No.: US 7,136,921 B2  
(45) Date of Patent: Nov. 14, 2006

(54) NETWORK SYSTEM, DETECTION METHOD AND MONITORING METHOD OF NETWORK ENTITY FAULTS, AND STORAGE MEDIUM

(75) Inventors: Ryota Motobayashi, Tokyo (JP);  
Hayato Momma, Tokyo (JP);  
Kazuhiko Azuma, Tokyo (JP);  
Fumiyasu Hayakawa, Tokyo (JP)

(73) Assignees: NEC Corporation, Tokyo (JP); The Tokyo Electric Power Company, Incorporated, Tokyo (JP)

( * ) Notice: Subject to any disclaimer, the term of this patent is extended or adjusted under 35 U.S.C. 154(b) by 710 days.

(21) Appl. No.: 10/173,110

(22) Filed: Jun. 18, 2002

(65) Prior Publication Data

US 2003/0009556 A1 Jan. 9, 2003

(30) Foreign Application Priority Data

Jun. 19, 2001 (JP) .............................. 2001/184331

(51) Int. Cl.  
*G06F 15/16* (2006.01)

(52) U.S. Cl. ...................................... 709/224; 370/242

(58) Field of Classification Search ........ 709/223–224, 709/235, 238–244, 200–201; 370/245–256, 370/351–356, 216, 228, 242  
See application file for complete search history.

(56) References Cited

U.S. PATENT DOCUMENTS 5,964,837 A * 10/1999 Chao et al. ................. 709/224  
2001/0056486 A1* 12/2001 Kosaka ........................ 709/224

FOREIGN PATENT DOCUMENTS

| JP | 63-117531 | 5/1988 |
|---|---|---|
| JP | 64-46346 | 2/1989 |
| JP | 2-60338 | 2/1990 |
| JP | 5-268231 | 10/1993 |
| JP | A 10-308761 | 11/1998 |

OTHER PUBLICATIONS

Network Working Group, "RFC 1716: Towards Requirements for IP Routers", P. Almquist, Nov. 1994, (Accessed from http://www.ietf.org/rfc/rfc1716.txt?number=1716 on Jul. 15, 2005).*  
Network Working Group, "RFC 2178: OSPF Version 2", J. Moy, Jul. 1997, (Accessed from http://www.ietf.org/rfc/2178.txt on Jul. 15, 2005).*  
Stevens, Richard. "TCP/IP Illustrated vol. 1". Addison Wesley: 1994. pp. 85-96.*

* cited by examiner (Continued)

Primary Examiner—Moustafa M. Meky  
(74) Attorney, Agent, or Firm—Young & Thompson

(57) ABSTRACT

A monitor (102) receives a returned response message, and stores the state of the link directed to the NE that returned the message as a successful transmission, and then repeats the same operation at arbitrary intervals. When the monitor can not receive the response message after placing a certain interval, it stores the link as an unsuccessful transmission. At this point, if all the links for a particular NE are in the unsuccessful state, the monitor informs an NMS (151) of a fault in that NE. If the NE truly has the NE fault, other NEs that also have the links to that fault NE inform the NMS of the fault. Thereby the NMS itself does not need to do the monitoring. The NMS only collates fault information with topology information stored in a topology information storage (153) and can judge that a particular NE is out of communication and control.

4 Claims, 5 Drawing Sheets

“NMS”) that manages the network entities. In such a network system, it is necessary to monitor and detect faults in the NEs. According to a conventional mode, system and method for monitoring and detecting the NE faults, the NMS applies polling to the NEs. It should be noted that the NE is also referred to as a network element, and the NMS is also referred to as a network monitoring device.

NETWORK SYSTEM, DETECTION METHOD AND MONITORING METHOD OF NETWORK ENTITY FAULTS, AND STORAGE MEDIUM

BACKGROUND OF THE INVENTION

The present invention relates to a network system comprising a plurality of network entities and a network management system for managing the network entities, and more particularly to a detection method of faults in the network entities.

One network system that is known has a plurality of network entities (hereafter also referred to as "NE") and a network management system (hereafter also referred to as "NMS") that manages the network entities. In such a network system, it is necessary to monitor and detect faults in the NEs. According to a conventional mode, system and method for monitoring and detecting the NE faults, the NMS applies polling to the NEs. It should be noted that the NE is also referred to as a network element, and the NMS is also referred to as a network monitoring device.

An example of a conventional monitoring method of network element faults is disclosed in Japanese Patent Application laid-open No. 10-308761 (hereafter referred to as a prior art document).

In the monitoring method of network element faults disclosed in this prior art document, the NMS applies polling to the NEs. Information on the adjacent NEs collected by the NEs and the state of connection ports are collected. Before the polling is applied to another NE, if the information collected from other adjacent NEs indicates that its NE direction is down, the polling is not performed and a load is reduced.

However, the prior art document shows the following problems.

The first problem is that, as the NMS applies polling to the NEs, an extra burden is caused if a processing load of the NMS is heavy for some reason.

The second problem is that the polling is not applied to the NEs that have faults, which delays the detection of the fault NEs when they recover from the fault.

SUMMARY OF THE INVENTION

It is an object of the present invention to provide a monitoring method and detection method of NE faults without having an NMS itself monitor them.

It is another object of the present invention to provide a monitoring method and detection method of NE faults without putting a burden on the NMS.

Other objects of the present invention will become clear as the description proceeds.

According to a first aspect of the present invention, there is provided a network system which comprises: a plurality of network entities, each of the plurality of network entities including detecting means for detecting faults in another of the network entities by the use of a plurality of links being between adjacent ones of the network entities and outputting means connected to the detecting means for outputting a detection result obtained by the detecting means for detecting to the network management system; and a network management system for managing the plurality of network entities, the network management system including judging means connected to the outputting means for judging the faults on the basis of the detection result.

According to a second aspect of the present invention, there is provided a network system which comprises a plurality of network entities connected via link groups and a network management system connected to the network entities via a communication link. Each of the network entities comprises entity communication means for managing and controlling protocols, the link groups, and the communication link, a link information storage for storing the link groups directed to other network entities as link information per network entity, and a monitor connected to the link information storage for monitoring the other network entities via the entity communication means by the use of the link information, the monitor responding to the monitoring from the other network entities via the entity communication means. The network management system comprises management communication means for managing and controlling protocols and the communication link, a topology information storage for storing topology information of the network system, and a network management connected to the management communication means and the topology information storage for processing a signal received by the management communication means on the basis of the topology information, and managing the network system.

According to a third aspect of the present invention, there is provided a network system which comprises a plurality of network entities connected via link groups and a network management system connected to the network entities via a communication link. Each of the plurality of network entities comprises entity communication means for managing and controlling protocols, the link groups, and the communication link, an entity topology information storage for previously storing circuit information that its network entities have, a dynamic router connected to the entity topology information storage for establishing a link with a neighboring entity by the use of the circuit information, and constituting topology information by exchanging the link state, and a monitor connected to the entity communication means and the dynamic router for monitoring the other network entities via the entity communication means by the use of the constituted topology information, and responding to the monitoring from the other network entities via the entity communication means. The network management system comprises management communication means for managing and controlling protocols and the communication link, a management topology information storage for storing topology information of the network system, and a network management connected to the management communication means and the management topology information storage for processing a signal received by the management communication means on the basis of the topology information, and managing the network system.

According to a fourth aspect of the present invention, there is provided a network system which comprises a plurality of network entities connected to each other via link groups and a network management system connected to the network entities via a communication link. Each of the plurality of network entities comprises entity communication means for managing and controlling protocols, the link groups, and the communication link, a static routing information storage for storing information on the link group as static routing information, and a monitor connected to the entity communication means and the static routing information storage for monitoring the other network entities via the entity communication means by the use of the static routing information, and responding to the monitoring from the other network entities via the entity communication means.

The network management system comprises management communication means for managing and controlling protocols and the communication link, a management topology information storage for storing topology information of the network system, and a network management connected to the management communication means and the management topology information storage for processing a signal received by the management communication means on the basis of the topology information, and managing the network system.

According to a fifth aspect of the present invention, there is provided a detection method of network entity faults in a network system which comprises a plurality of network entities and a network management system for managing the network entities. The method comprises the steps of detecting, in each of the network entities, the network entity faults in another of the network entities by the use of a plurality of links being between adjacent ones of the network entities to produce a detection result, outputting the detection result from each of the network entities to the network management system, and judging the faults on the basis of the detection result in the network management system.

According to a sixth aspect of the present invention, there is provided a monitoring method in a network entity of other network entities connected to the network entity via link groups, the network entity being connected to a network management system via a communication link. The monitoring method comprises the steps of selecting, as a selected link, a link from the link groups in order, judging whether the selected link can be used at present or not, sending a response request message via the selected link if the selected link can be used, and waiting for a response message thereto, setting a reception state of the selected link for "abnormal" if the selected link can not be used, if a transmission of the response request message is unsuccessful, or if the response message can not be received, and if the reception state of all the links in the same link group including the selected link is abnormal, informing the network management system of a fault in the network entity that corresponds to the abnormal link group.

According to a seventh aspect of the present invention, there is provided a storage medium storing a program to be executed by one of network entities. The program comprises the processes of detecting faults in another of the network entities by the use of a plurality of links being between adjacent ones of the network entities to produce a detection result and outputting the detection result to a network management system.

According to an eighth aspect of the present invention, there is provided a storage medium storing a program to be executed by one of network entities which is connected to another of the network entities via link groups and also connected to a network management system via a communication link. The program lets the one of the network entities monitor the other of the network entities. The program comprises the processes of selecting a link from the link groups in order, judging whether the selected link can be used at present or not, sending a response request message via the selected link if the selected link can be used, and waiting for a response message thereto, setting a reception state of the selected link for "abnormal" if the selected link can not be used, if a transmission of the response request message is unsuccessful, or if the response message can not be received, and if the reception state of all the links in the same link group including the selected link is abnormal, informing the network management system of a fault in the network entity that corresponds to the abnormal link group.

DESCRIPTION OF THE PREFERRED EMBODIMENTS

Embodiments of the present invention will be described in detail with reference to the drawings.

Figure 1:
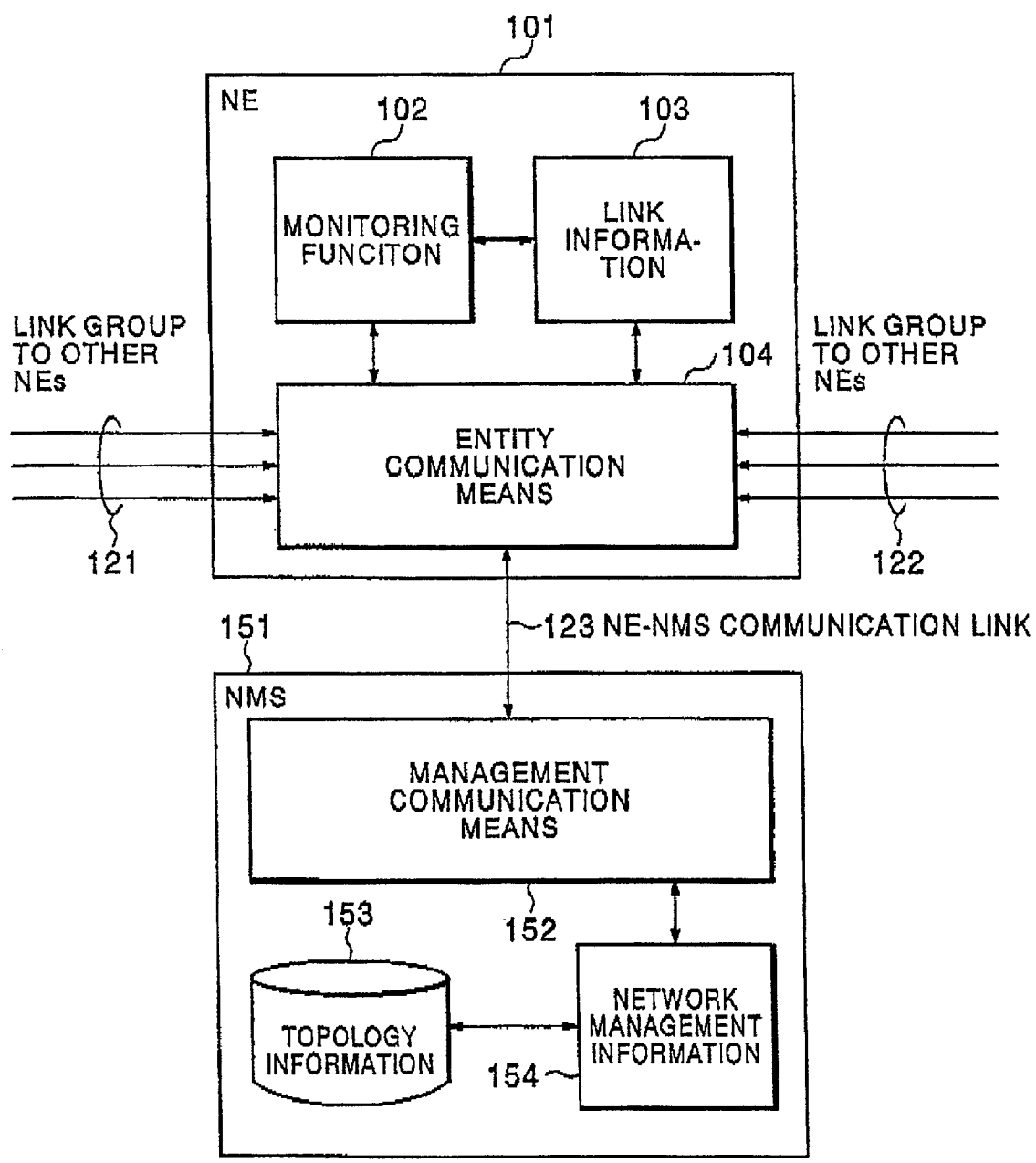
FIG. 1 is a block diagram of a network system that enables a detection method of network entity faults according to one embodiment of the present invention.

With reference to FIG. 1, description will be made at first as regards a network system that enables a detection method of network entity faults according to an embodiment of the present invention. The network system shown is constituted of a plurality of network entities (NEs) (only one network entity is shown in FIG. 1) 101, and a network management system (NMS) 151. The network entity 101 and the network management system 151 are interconnected by an NE-NMS communication link 123.

The network entity 101 is constituted of a monitor 102 for enabling a monitoring function, a link information storage 103 for storing link information, and an entity communication means 104. These are interconnected. The entity communication means 104 is connected to other network entities (not shown) via link groups (transmission paths) 121 and 122. The entity communication means 104 is also connected to the network management system 151 via the NE-NMS communication link 123.

The entity communication means 104 manages and controls a protocol of network node interface (NNI), protocols such as common management information protocol (CMIP), and their transmission path or the like. The link information storage 103 stores link groups directed to other NEs classifying them by the NEs. The monitor 102 monitors other NEs by using the link information stored in the link information storage 103, and responds to the monitoring from other NEs. In this process, the entity communication means 104 provides the monitor 102 with means for passing messages, which are used for monitoring received from each link, to the monitor 102 and sending the messages passed from the monitor 102 to specified links.

On the other hand, the network management system 151 has a management communication means 152, a topology information storage 153 for storing topology information, and a network management 154 for enabling network management functions. The network management 154 is connected to the management communication means 152 and the topology information storage 153.

The management communication means 152 manages and controls the protocols such as the common management information protocol (CMIP) and their transmission path. The topology information storage 153 stores the topology information of the network. The network management 154 manages the network.

The management communication means 152 is connected to the network entity 101 via the NE-NMS communication link 123. That is, the entity communication means 104 of the network entity 101 and the management communication means 152 of the network management system 151 are interconnected via the NE-NMS communication link 123.

As described above, the NE 101 includes the two links directed to other NEs as an example; the link group 121 and the link group 122, and the communication link 123 between the NE 101 and the NMS 151.

In FIG. 1, the link information storage 103 stores a plurality of links directed to other NEs and their state as the link information for every NE. The monitor 102 selects one link for each of other NEs at arbitrary intervals in order, and sends a response request message to other NEs using the entity communication means 104.

In other NEs, the response request messages are received. Their monitors return corresponding response messages via the same links through which the messages are received by way of the entity communication means.

The monitor 102 receives the returned response message, and stores the state of the link directed to the NE that returned the message as a successful transmission, and then repeats the same operation at arbitrary intervals.

When the monitor 102 can not receive the response message after placing a certain interval, it stores the link as an unsuccessful transmission. At this point, if all the links directed to a particular NE are in the unsuccessful state, the monitor 102 informs the NMS 151 of a fault in that NE. If the NE truly has the NE fault, other NEs that also have the links to that fault NE inform the NMS 151 of the fault.

In this way, other NEs that have the links to the fault NE monitor the fault and inform the NMS 151. Thereby the NMS 151 itself does not need to do the monitoring. The NMS 151 only collates fault information with the topology information stored in the topology information storage 153 and can judge that a particular NE is out of communication and control.

Figure 2:
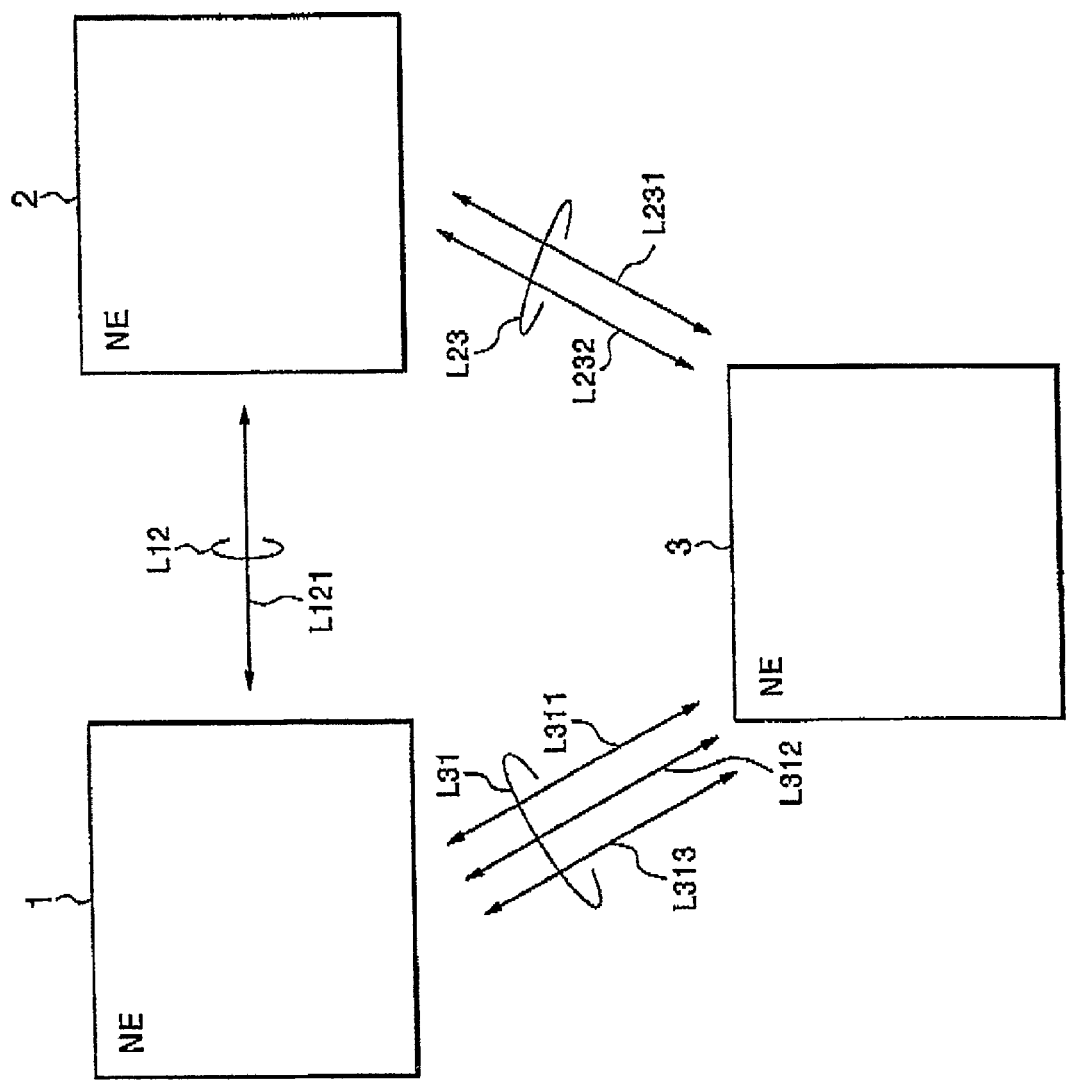
FIG. 2 is a constitutional view of a network constitution according to one embodiment of the present invention.

With reference to FIG. 2, the description will be directed to a network constitution according to an embodiment of the present invention. In FIG. 2, three NEs are provided: a first NE1, a second NE2, and a third NE3. The link groups between each NE are constituted of a first link group L12 between the first NE1 and the second NE2, a second link group L23 between the second NE2 and the third NE3, and a third link group L31 between the third NE3 and the first NE1. Each link group, for example, the third link group L31 is constituted of each of links L311, L312 and L313. Information on each link group is stored in the link information of each NE. It should be noted that, in this Figure, the NMS is omitted.

It will be appreciated that the entity communication means 104, the management communication means 152 and the NMS 151 in FIG. 1 are well known to those skilled in the art. These are not directly related to the present invention and their detailed constitutions are omitted.

In FIG. 2, two link groups directed to other NEs are provided for every NE and the number of links included in the link group is one to three. It is appreciated that the numbers are not limited.

Figure 3:
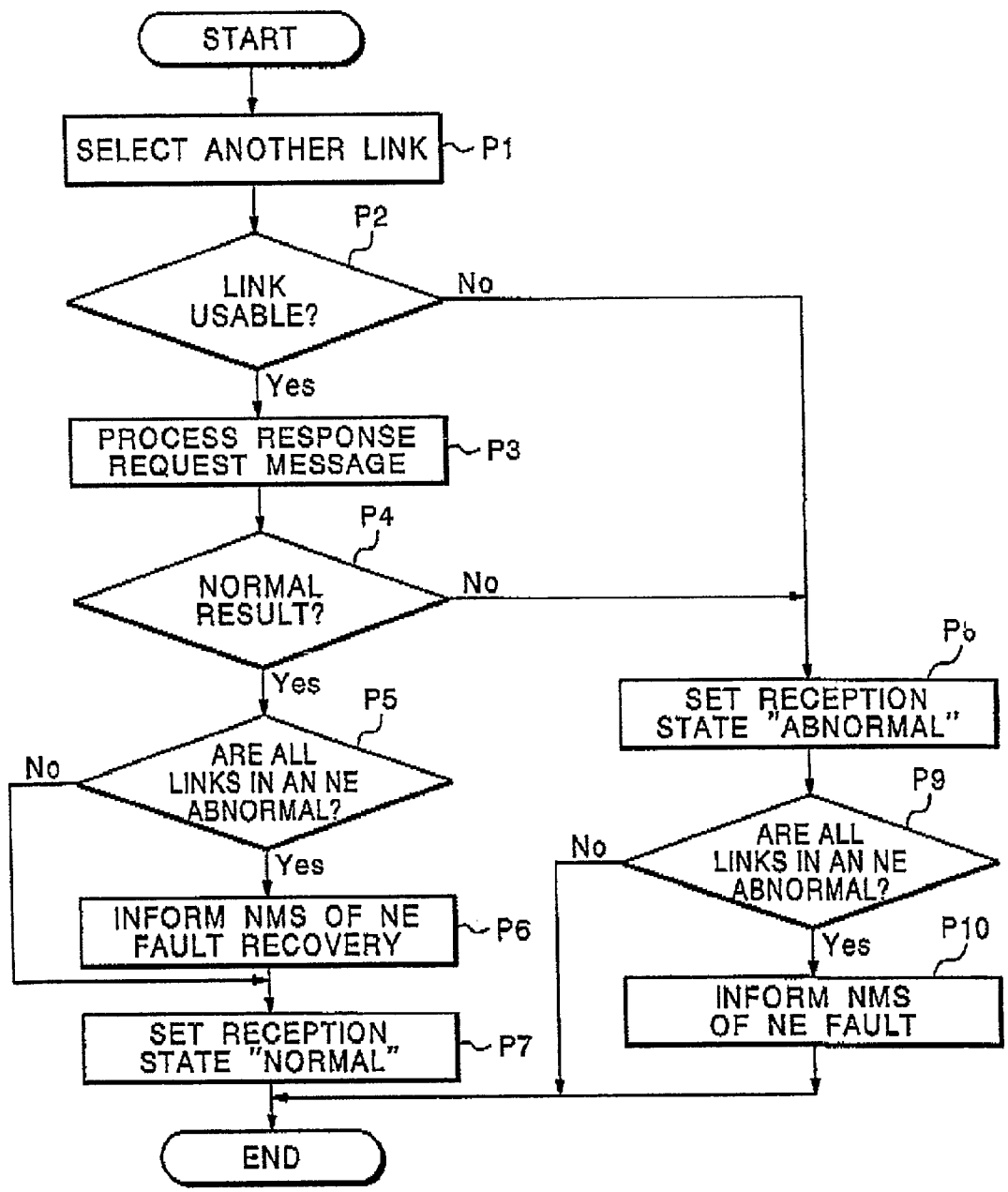
FIG. 3 is a flowchart for describing an operation of the network system included in the network constitution of FIG. 2.

With reference to FIG. 3, the description will be made as an operation of the monitor 102 in FIG. 1 as the operation of the third NE3 in FIG. 2.

The monitor 102 of the third NE3 applies processing shown in FIG. 3 to the link groups that correspond to each NE at arbitrary intervals. First, the monitor 102 selects a link from the link groups in order (step P1). Then, the monitor 102 judges whether the link can be used or not at present (step P2). When the link can be used, the monitor 102 sends the response request message via the communication means 104 and waits for the response message thereto (step P3). If the result is normal and the reception state of all the links in the same link group is "abnormal", the monitor 102 informs the NMS 151 (FIG. 1) of a fault recovery of the NE corresponding to the link group (steps P5 and P6), and set the reception state for "normal" (step P7), and then ends the processing. After ending the processing, the monitor 102 repeats the processing at arbitrary intervals, and scans all the links.

On the contrary, if the link can not be used, if the transmission of the response request message is unsuccessful, and if the response message can not be received, the monitor 102 sets the reception state for "abnormal" (step P8). At this point, if the reception state of all the links in the same link group is abnormal, the monitor 102 informs the NMS of the fault in the NE that corresponds to the link group (steps P9 and P10).

The description will be proceeded as regards the operation.

The third NE3 in FIG. 2 applies processing to the third link group L31 directed to the first NE1 and the second link group L23 directed to the second NE2 at arbitrary intervals. It will be assumed that the reception state of all the links in all the link groups is normal.

In this state, it will be assumed, for example, that the result of the processing applied to the link L311 in the third link group L31 are abnormal, and that the results of the processing applied to the link L312 and the link L313 are also abnormal. In this case, the third NE3 informs the NMS 151 of the fault in the NE1. If the first NE1 is truly the fault, all the links in the first link group L12 directed to the first NE1 when seen from the second NE2 are abnormal; in this case the state of the link L121 is also abnormal. Accordingly, the second NE2 informs the NMS 151 of the fault in the first NE1. In the NMS 151, the topology information storage 153 has previously stored the topology information that indicates that the first NE1 is connected to the third NE3 and the second NE2. Therefore, at the time when informed by the second NE2 and the third NE3 that the first NE1 is the fault, the NMS 151 can judge that the NE1 is the true fault.

It is, however, not always necessary for the third NE3 to apply processing to a plurality of link groups at the same time. The third NE3 may apply processing to each link group at separate timings.

Figure 4:
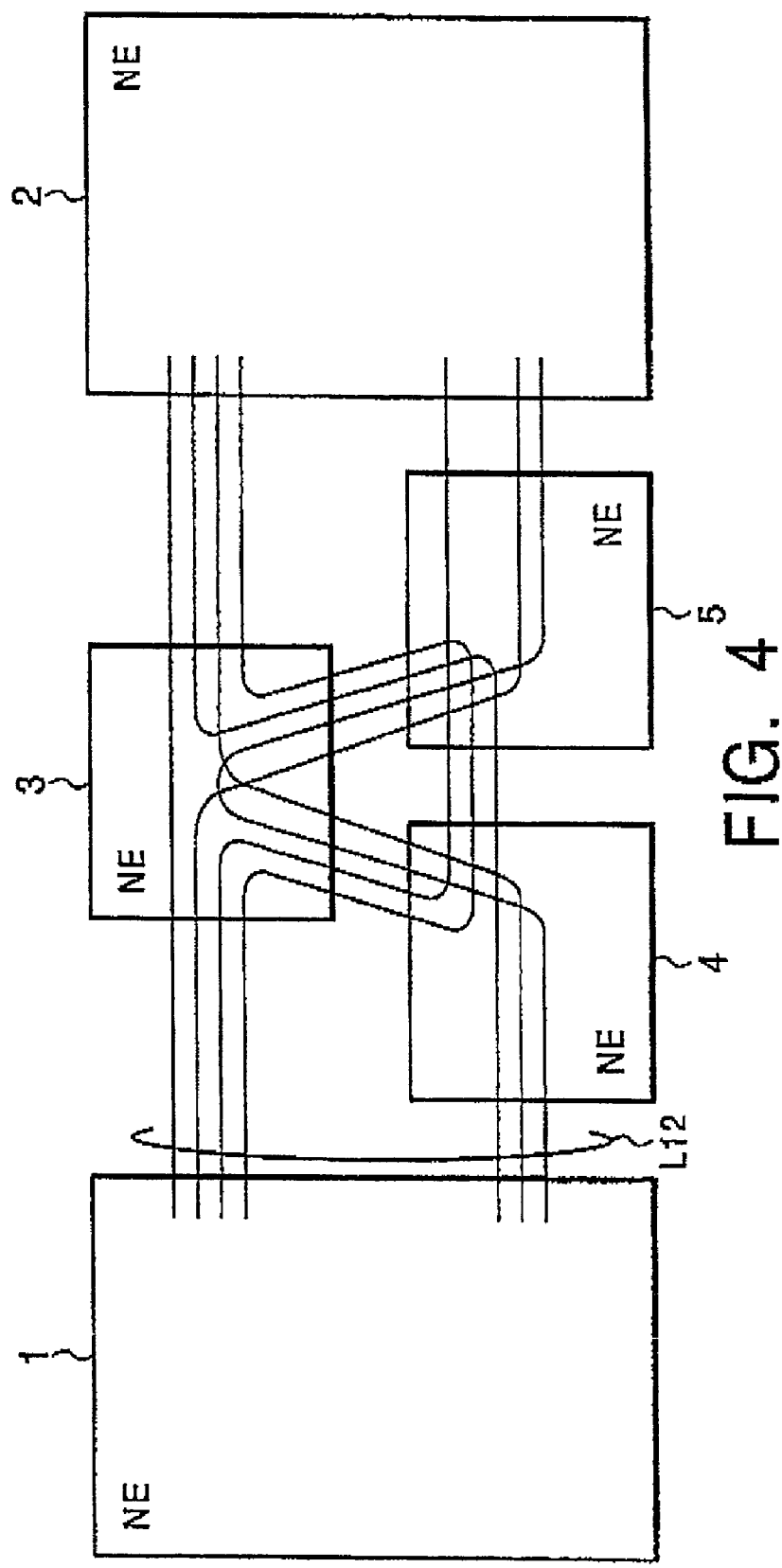
FIG. 4 is a constitutional view of a link showing a network constitution according to another embodiment of the present invention.

With reference to FIG. 4. the description will be made as regards a network constitution according to another embodiment of the present invention. The network constitution includes similar parts or portions designated by like reference numerals.

In the network constitution of FIG. 4, more ideas are added to the way of setting the link groups. Between the first NE1 and the second NE2, a third NE3, a fourth NE4 and a fifth NE5 are provided. These are supposed to be NEs that let the links pass and are not directly concerned with the contents of communications, for example, a cross connect device (XC) and a signal transfer point (STP). In such a case where the XC or the like is on the transmission path that forms the link, patterns of links that can be set between the NEs are increased. It is therefore possible to provide various transmission paths for the links in the link group L12.

With the network constitution of FIG. 4 and the similar monitoring operation performed with a larger number of NEs constituting the network, it is possible to produce effects of reducing influence that the transmission path fault has on the monitoring of the NE fault.

Figure 5:
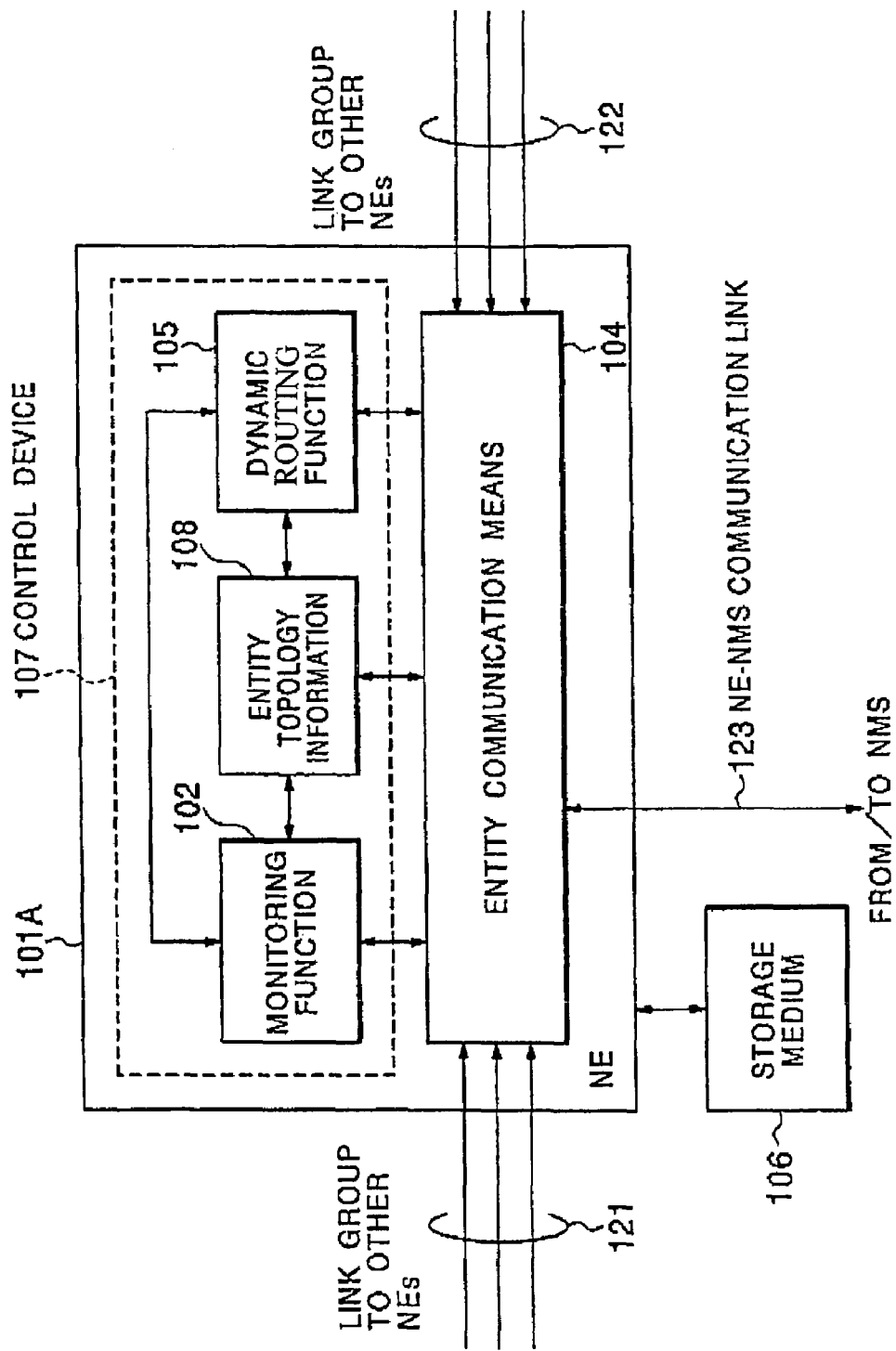
FIG. 5 is a block diagram of a network system according to still another embodiment of the present invention.

With reference to FIG. 5, the description will be made as regards a network system according to still another embodiment of the present invention. Similar parts or portions are designated by like reference numerals.

In the network system of FIG. 5, other ideas are added to the way of setting the link information. In a network entity 101A shown, the link information storage 103 is replaced with an entity topology information storage 108, and a dynamic router 105 that enables a dynamic routing function is added. That is the different point from the network entity 101 shown in FIG. 1. The monitor 102, the entity topology information storage 108 and the dynamic router 105 constitute a control device 107.

The entity topology information storage 108 previously stores circuit information that its NE has as the topology information. The dynamic router 105 establishes the links with neighboring NEs using the circuit information, and exchanges the link state or the like to constitute the topology information. It is appreciated that the dynamic router function enabled by the dynamic router 105 and the topology information stored in the topology information storage 108 are well known to those skilled in the art. These are not directly related to the present invention and their detailed constitutions are omitted.

The monitor 102 performs the monitoring process for every corresponding NE or for every link group in the same way as the former embodiment, using the constituted topology information stored in the topology information storage 108. In this way, by combining other functions that form the topology information, it is possible to monitor the NEs without providing the link information only for the purpose of monitoring the faults in the NEs.

The monitoring function is performed by obtaining the link information from the topology information. If a function of having contact with other NEs frequently, which would correspond to the response message used for the monitoring, is provided and made available by other functions such as the dynamic routing function, the monitoring function may inform the NMS using only the result of that function.

The dynamic routing function and the entity topology information are used. However, the same effects can be obtained if information on the link groups is obtained from static routing information used in a function of performing static routing.

Furthermore, a network system according to still another embodiment will be described with reference to the network system shown in FIG. 5. in the network system, a storage medium 106 in which a monitoring program is stored is provided. The storage medium 106 may be a magnetic disk, magnetic tape, semiconductor memory or any other type of storage medium. The monitoring program is read by the control device 107 of the NE, and controls the operation of the control device 107. The control device 107 performs the same processing as in the above embodiments under the control of the monitoring program.

While the present invention has thus far been described in connection with a few embodiments thereof, it will readily be possible for those skilled in the art to put this invention into practice in various other manners.

What is claimed is:

1. A method of detecting network entity faults in a network that includes plural network entities and a network manager, the method comprising the steps of:

at each of the plural network entities, testing a status of each communication link to the network entities connected thereto until the status of each communication link to the network entities connected thereto is tested;

repeating the status testing step;

when one of the plural network entities finds that every communication link between itself and another of the network entities is abnormal, the one of the plural network entities sending a report to the network manager; and the network manager evaluating reports received from the plural network entities to determine whether one of the network entities has a fault, wherein the status testing step includes the steps of selecting a respective communication link and sending a response request message via the selected communication link.

2. The method of claim 1, wherein the step of selecting a respective communication link is carried out at arbitrary intervals and in order.

3. A network comprising:

plural network entities and a network manager;

each of said plural network entities including status testing means for testing a status of each communication link to the network entities connected thereto until the status of each communication link to the network entities connected thereto is tested, and for repeating the status testing;

each of said plural network entities including output means for sending a report to said network manager when the respective one of the plural network entities finds that every communication link between itself and another one of the network entities is abnormal; and said network manager including means for evaluating reports received from the plural network entities to determine whether one of the network entities has a fault, wherein said status testing means selects a respective communication link and sends a response request message via the selected communication link.

4. The network of claim 3, wherein the respective communication link is selected at arbitrary intervals and in order.

* * * * *